United States Patent
Butcher et al.

(10) Patent No.: US 10,936,299 B2
(45) Date of Patent: Mar. 2, 2021

(54) AUTOMATED INTRA-SYSTEM PERSISTENT MEMORY UPDATES

(71) Applicant: DELL PRODUCTS, L.P., Round Rock, TX (US)

(72) Inventors: Wade A. Butcher, Cedar Park, TX (US); Vijay B. Nijhawan, Austin, TX (US); Sumanth Vidyadhara, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/581,054

(22) Filed: Apr. 28, 2017

(65) Prior Publication Data

US 2018/0314511 A1    Nov. 1, 2018

(51) Int. Cl.
*G06F 8/654* (2018.01)

(52) U.S. Cl.
CPC .................. *G06F 8/654* (2018.02)

(58) Field of Classification Search
CPC ........ G06F 8/654; G06F 8/65; G06F 12/0246; G06F 3/0679; G06F 2212/202; G06F 12/0804; G06F 8/658; G06F 21/572; G06F 9/4401; G06F 21/575; G06F 2212/2022; G06F 1/3287; G06F 1/3275; G11C 7/20

See application file for complete search history.

(56) References Cited

U.S. PATENT DOCUMENTS

| | | | |
|---|---|---|---|
| 7,073,017 B2 * | 7/2006 | Yamamoto | G06F 8/65 711/103 |
| 8,145,893 B2 * | 3/2012 | Narayanan | G06F 9/4401 711/170 |
| 8,498,008 B2 * | 7/2013 | Kojima | G06F 3/1204 358/1.15 |

(Continued)

OTHER PUBLICATIONS

Seung Jei Yang et al.; New acquisition method based onfirmware update protocolsfor Android smartphones; Elsevier; pp. S68-s76 ; retrieved on Nov. 16, 2020 (Year: 2015).*

(Continued)

*Primary Examiner* — S. Sough
*Assistant Examiner* — Cuong V Luu
(74) *Attorney, Agent, or Firm* — Isidore PLLC (57) ABSTRACT

An Information Handling System (IHS) has persistent memory device(s) coupled to a processor. Each memory device includes a first firmware image, version identifying information associated with the first firmware image, and device type identifying information. A firmware interface suite coupled to the processor has a firmware interface that is executed by the processor. The processor responds to identifying a trigger condition for automatic intra-system firmware update of a persistent memory device. The processor accesses the version identifying information and the device type identifying information for a first memory device containing the first firmware image of the persistent memory device(s). The processor associates the device type identifying information with device type information for a (Continued)

second memory device. In response to the first firmware image being different from the second firmware image, the processor selectively replaces the first firmware image on the first memory device with the second firmware image.

17 Claims, 7 Drawing Sheets

(56) References Cited

U.S. PATENT DOCUMENTS

| | | | |
|---|---|---|---|
| 8,601,460 | B2 | 12/2013 | Karstens |
| 9,563,439 | B2 | 2/2017 | Khatri et al. |
| 2005/0188170 | A1* | 8/2005 | Yamamoto ............... G06F 8/65 711/170 |
| 2007/0168571 | A1 | 7/2007 | Ramsey et al. |
| 2009/0119498 | A1* | 5/2009 | Narayanan ............ G06F 9/4401 713/2 |
| 2010/0315670 | A1* | 12/2010 | Kojima ................ G06F 3/1204 358/1.15 |
| 2011/0083129 | A1* | 4/2011 | Masaki ..................... G06F 8/65 717/175 |
| 2014/0136856 | A1* | 5/2014 | Flynn .................... G06F 9/4406 713/193 |
| 2015/0006967 | A1* | 1/2015 | Dang .................. G06F 11/3037 714/39 |
| 2015/0199190 | A1* | 7/2015 | Spangler ................. G06F 8/654 713/2 |
| 2015/0378841 | A1 | 12/2015 | Jayakumar et al. |
| 2016/0011802 | A1 | 1/2016 | Berke |
| 2016/0117165 | A1* | 4/2016 | Cavalaris ............... G06F 8/654 717/169 |
| 2016/0170841 | A1* | 6/2016 | Yarnell .............. G06F 11/1076 714/19 |
| 2016/0202964 | A1* | 7/2016 | Butcher .................... G06F 8/65 717/172 |
| 2016/0217047 | A1 | 7/2016 | Ignomirello et al. |
| 2016/0371002 | A1* | 12/2016 | Bahali .................. G06F 3/0604 |
| 2017/0131991 | A1* | 5/2017 | Su .............................. G06F 8/66 |

OTHER PUBLICATIONS

Goran Jurkovic et al.; Remote Firmware Update for Constrained Embedded Systems; MIPRO; pp. 1019-1023; retrieved on Nov. 16, 2020 (Year: 2014).*

* cited by examiner

AUTOMATED INTRA-SYSTEM PERSISTENT MEMORY UPDATES

BACKGROUND

1. Technical Field

The present disclosure relates in general to firmware controlled persistent memory modules of an information handling system (IHS), and more particularly to a method and system for updating a firmware image of persistent memory modules in firmware of an IHS.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS can include non-volatile dual inline memory modules (NVDIMMs) that preserve data indefinitely after a system input power failure or normal power down mode. After the power is restored to the IHS, data can be retrieved from the NVDIMM by the IHS. NVDIMMs are examples of functional components that include a controller, which executes a firmware image contained in firmware. Recent technology releases for NVDIMMs provide for updating the firmware image after deployment and installation. NVDIMMs can be inserted after deployment of the IHS for maintenance or upgrade purposes. Replacing or adding NVDIMMs in servers can result in mismatched versions of firmware images in firmware. Memory features, such as interleaving, may suffer from mismatched persistent memory devices containing different firmware versions. However, updating firmware for any type of device in a datacenter of IHSs has been cited many times as a big challenge and a pain point for datacenter operators.

BRIEF SUMMARY

In accordance with embodiments of the present disclosure, the IHS includes one or more persistent memory devices coupled to a processor. Each memory device includes: (i) a first firmware image; (ii) firmware version identifying information associated with the first firmware image; and (iii) device type identifying information. A firmware interface suite is coupled to the processor and includes a firmware interface that is executed by the processor. The processor identifies at least one of a plurality of possible trigger conditions for automatic intra-system firmware update of a persistent memory device. In response to the trigger condition, the processor associates the device type identifying information with device type information for a second memory device. The processor compares firmware versions between the first firmware image and a second firmware image associated with the second memory device. In response to the first firmware image being different from the second firmware image, the processor selectively replaces the first firmware image on the first memory device with the second firmware image.

According to illustrative embodiments of the present disclosure, a method includes identifying, by a processor executing a firmware interface of an IHS, at least one of a plurality of possible trigger conditions for automatic intra-system firmware update of a first memory device of one or more persistent memory devices. In response to identifying the at least one of the plurality of possible trigger conditions, the method includes accessing, by the processor, version identifying information associated with a first firmware image contained in the first memory device of one or more persistent memory devices. The processor associates the device type identifying information with device type information for a second memory device. The method includes comparing, by the processor, firmware versions between the first firmware image and a second firmware image associated with the second memory device. In response to the first firmware image being different from the second firmware image, the method includes the processor selectively replacing the first firmware image on the first memory device with the second firmware image.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

In accordance with the teachings of the present disclosure, an information handling system (IHS) includes persistent memory devices that have updateable firmware. A firmware interface performs an automated intra-system update. Examples of a firmware interface include a basic input/output system (BIOS), a unified extensible firmware interface (UEFI) driver, or software including a driver invoked by the operating system. A new firmware image is identified from within the IHS and loaded in one of the persistent memory devices. The automatic intra-system updating by the firmware interface can be optionally gated by configuration settings that enables the feature. The present innovation removes an administrative burden on operators who configure the IHS, such as in a datacenter.

An IHS has persistent memory device(s) coupled to a processor. Each memory device includes a first firmware image, version identifying information associated with the first firmware image, and device type identifying information. A firmware interface suite coupled to the processor has a firmware interface that is executed by the processor. The processor responds to identifying a trigger condition for automatic intra-system firmware update of a persistent memory device. The processor accesses the version identifying information and the device type identifying information for a first memory device containing the first firmware image of the persistent memory device(s). The processor associates the device type identifying information with version identifying information for a second firmware image that is locally accessible within the IHS. The processor replaces the first firmware image on the first memory device with the second firmware image.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
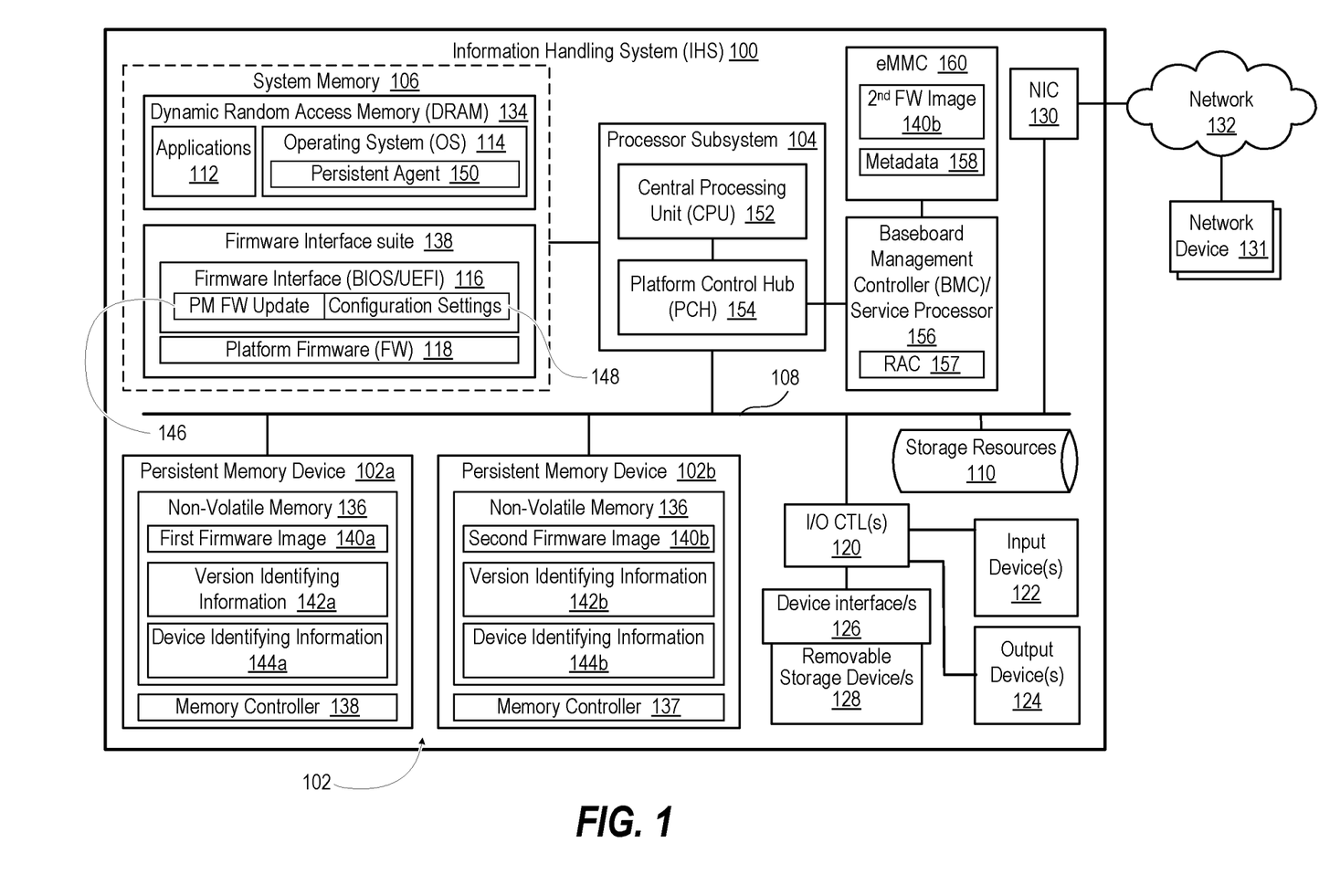
FIG. 1 illustrates a block diagram representation of an example information handling system (IHS) that supports intra-system updating of firmware of persistent memory devices, according to one or more embodiments.

FIG. 1 illustrates a block diagram representation of an example IHS 100 having one or more persistent memory devices 102 coupled to a processing subsystem, or "processor", 104. IHS 100 can automatically update the persistent memory devices 102 with a locally-accessible copy of a firmware image. Thereby the persistent memory devices 102 can operate using the same version of firmware image. Within the general context of IHSs, the IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal digital assistant (PDA), a consumer electronic device, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring again to FIG. 1, processor subsystem 104 is coupled to system memory 106 via system interconnect 108. System interconnect 108 can be interchangeably referred to as a system bus, in one or more embodiments. System interconnect 108 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. For the purpose of this disclosure, system bus 108 can also be a Double Data Rate (DDR) memory interface. The system memory 106 can either be contained on separate removable dual inline memory module (RDIMM) devices or system memory 106 can be contained within persistent memory devices (NVDIMMs). For example, the NVDIMM-N variety of NVDIMMs contain both random access memory, which can serve as system memory, and non-volatile memory. It should be noted that other channels of communication can be contained within system bus 108, including but not limited to i2c or system management bus (SMBus). System interconnect 108 communicatively couples various system components including, for example, replaceable local storage resources 110 such as solid state drives (SDDs) and hard disk drives (HDDs) within which can be stored one or more software and/or firmware modules and one or more sets of data that can be utilized during operations of management IHS 100. Specifically, in one embodiment, system memory 106 can include therein a plurality of such modules, including one or more of application(s) 112, operating system (OS) 114, a firmware interface 116 such as basic input/output system (BIOS) or Uniform Extensible Firmware Interface (UEFI), and platform firmware (FW) 118. These software and/or firmware modules have varying functionality when their corresponding program code is executed by processor subsystem 104 or secondary processing devices within management IHS 100. For example, application(s) 112 may include a word processing application, a presentation application, and a management station application, among other applications.

IHS 100 further includes one or more input/output (I/O) controllers 120 that support connection by and processing of signals from one or more connected input device/s 122, such as a keyboard, mouse, touch screen, or microphone. I/O controllers 120 also support connection to and forwarding of output signals to one or more connected output devices 124, such as a monitor or display device or audio speaker(s). Additionally, in one or more embodiments, one or more device interfaces 126, such as an optical reader, a universal serial bus (USB), a card reader, Personal Computer Memory Card International Association (PCMCIA) slot, and/or a high-definition multimedia interface (HDMI), can be associated with IHS 100. Device interface(s) 126 can be utilized to enable data to be read from or stored to corresponding removable storage device/s 128, such as a compact disk (CD), digital video disk (DVD), flash drive, or flash memory card. In one or more embodiments, device interface(s) 126 can further include general purpose I/O interfaces such as inter-integrated circuit ($I^2C$), system management bus (SMB), and peripheral component interconnect (PCI) buses.

IHS 100 comprises a network interface controller (NIC) 130. NIC 130 enables IHS 100 and/or components within IHS 100 to communicate and/or interface with other devices, services, and components that are located external to IHS 100, represented as network devices 131. These devices, services, and components can interface with IHS 100 via an external network, such as example network 132, using one or more communication protocols that include transport control protocol (TCP/IP) and network block device (NBD) protocol. Network 132 can be a local area network, wide area network, personal area network, and the like, and the connection to and/or between network and IHS 100 can be wired, wireless, or a combination thereof. For purposes of discussion, network 132 is indicated as a single collective component for simplicity. However, it should be appreciated that network 132 can comprise one or more direct connections to other devices as well as a more complex set of interconnections as can exist within a local area network or a wide area network, such as the Internet.

In an exemplary embodiment, the persistent memory devices 102 can be non-volatile dual in-line memory modules (NVDIMMs), and specifically NVDIMM-N memory that combines dynamic random access memory (DRAM) 134 and negative-AND (NAND) Flash non-volatile memory 136. For clarity, DRAM 134 of the persistent memory devices 102 is illustrated as functionally separate from the persistent memory devices 102 as part of, or the entirety of, the system memory 106 supporting applications 112 and OS 114. The Flash non-volatile (NV) memory 136 of the persistent memory devices 102 provides backup and restore of all DRAM 134 of the persistent memory devices 102 for reliable data persistence through power failure. A memory controller 137 can provide memory features such as the backing up and restoring features. Distinct from the persistent memory devices 102, firmware interface 116 and platform firmware 118 of the system memory 106 are part of a firmware interface suite 138.

For clarity, persistent memory devices 102 include a first persistent memory device 102a that contains: (i) a first firmware image 140a; (ii) version identifying information 142a associated with the first firmware image 140a; and (iii) device type identifying information 144a stored in NV memory 136. Persistent memory devices 102 include a second persistent memory device 102b that contains: (i) a second firmware image 140b; (ii) version identifying information 142b associated with the second firmware image 140b; and (iii) device type identifying information 144a stored in NV memory 136.

In one or more embodiments, the firmware interface 116 includes a persistent memory (PM) firmware (FW) update utility 146 that is optionally executed according to FW update configuration settings 148. PM FW update utility 146 causes the processor subsystem 104 to identify a triggering condition. In response to the triggering condition, the second firmware image 140b is identified as an appropriate replacement for the first firmware image 140a such as during a restart of the IHS 100. In one or more embodiments, identification of the trigger condition and updating of the firmware image both occur during restart of the IHS 100. In one or more embodiments, the PM FW update utility 146 causes a persistent agent 150 to be activated as part of the OS 114. The persistent agent 150 identifies a triggering condition such as a hot plugging event of the first persistent memory device 102a. For example, by inserting an updated persistent memory device 102b, the other persistent memory devices 102 of the same device type can be automatically upgraded to a later version of the firmware image 140b.

In the previously described embodiments, IHS 100 can be provisioned with an appropriate version of the firmware image 140b by inserting a persistent memory device 102b. Performing a routine maintenance or upgrade action on one persistent memory device 102 can cause an automatic version update. As an additional or alternative path, a firmware image 140b can be remotely communicated via an out-of-band communication to the IHS 100 without having to physically change a persistent memory device 102. Thus, in one or more embodiments, the second firmware image 140b is locally accessible to the IHS 100 in a location other than persistent memory device 102. Processor subsystem 104 can include a central processing unit (CPU) 152 that is augmented by a platform control hub (PCH) 154. The PCH 154 interfaces to functional components of the IHS 100 such as a baseboard management controller (BMC)/service processor 156. Out-of-band communication for the IHS 100 can be performed by the baseboard management controller (BMC)/service processor 156 via the NIC 130 and network 132 to network device 131 such as a management console. The management console can provide configuration settings for automatic intra-system firmware updates and can provide a firmware image 140b. BMC/support processor 156 with remote access controller (RAC) 157 can have access to the second firmware image 140b along with metadata 158 in embedded multimedia card (eMMC) 160, which is local memory. The eMMC 160 is a flash memory and controller packaged into a small ball grid array (BGA) integrated circuit (IC) package for use in circuit boards as an embedded non-volatile memory system. Second firmware image 140b in this instance represents a reference image stored on another device to use for the update. Metadata 158 is stored with the second firmware image 140b for associating with the version identifying information 142b and device type identifying information 144a. In one or more embodiments, metadata 158 includes a Firmware Management Protocol (FMP) driver Globally Unique Identifier (GUID) allowing a vendor-specific update rather than a Joint Electron Device Engineering Council (JEDEC) standard update for a class of persistent memory devices 102. A memory original equipment manufacturer (OEM) can write data to an allocated partition in NV memory. Alternatively, the data can be written in serial presence detect (SPD) of the NV memory 136. The data can include: (1) an FMP driver Globally Unique Identifier (GUID), which is an identifier for the PM FW update utility 146 of the firmware interface 116 to use for the update. The data can also include a lowest supported firmware version for explicitly calling out backward compatibility requirements.

Figure 2:
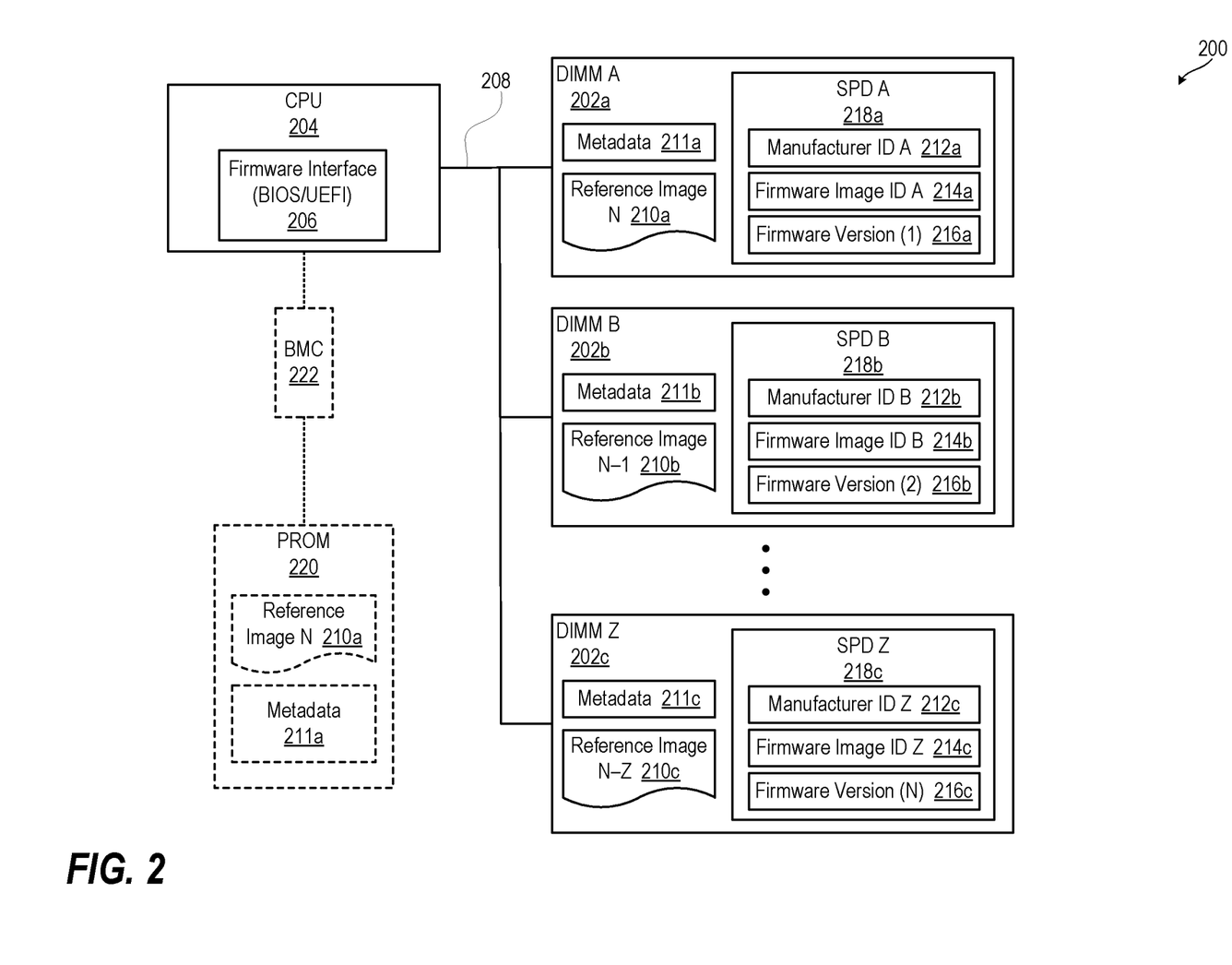
FIG. 2 illustrates a block diagram representation of a topology of IHS data fields used for updating the firmware of persistent memory devices, according to one or more embodiments.

FIG. 2 illustrates a topology of an IHS, in the example of IHS 200 including pertinent data fields in dual inline memory module (DIMM) SPD proposed for enabling the feature of automatic intra-system firmware update of the DIMM. SPD is a standardized way to automatically access information about a memory module. The persistent memory devices, such as DIMMs 202a, 202b, 202c, automatically receive an appropriate reference image if different from the programmed reference image. CPU 204 executes firmware interface 206 that identifies a trigger condition via system interface 208 for automatic intra-system update of firmware for persistent memory devices. DIMM A 202a is illustrated as including a reference image N 210a with associated metadata 211a as well as manufacturer identifier (ID) A 212a, firmware image ID A 214a, and firmware version ID A 216a in SPD A 218a. DIMM B 202b is illustrated as including a reference image N−1 210b with associated metadata 211b as well as manufacturer identifier (ID) B 212a, firmware image ID B 214b, and firmware version ID B 216b in SPD B 218b. Various numbers and types of DIMMs can also be present as illustrated by DIMM Z 202c. DIMM Z 202c is illustrated as including a reference image N-Z 210c with associated metadata 210c as well as manufacturer identifier (ID) Z 212c, firmware image ID Z 214c, and firmware version ID Z 216c in SPD Z 218c. Firmware interface 206 can also access a reference image N 210a with associated metadata 211a in programmable read only memory (PROM) 220 via BMC 222. The data fields and locally stored versions of the reference image enable firmware interface 206 to determine what version to update or rollback to.

FIGS. 3-7 illustrate flowcharts of exemplary methods 300, 400, 500, 600, 700 by which processor subsystem 104 (FIG. 1) performs different aspects of the processes that enable the one or more embodiments of the disclosure. Generally, methods 300, 400, 500, 600, 700 represent computer-implemented methods. The description of methods 300, 400, 500, 600, 700 is provided with general reference to the specific components illustrated within FIGS. 1 and 2.

Figure 3:
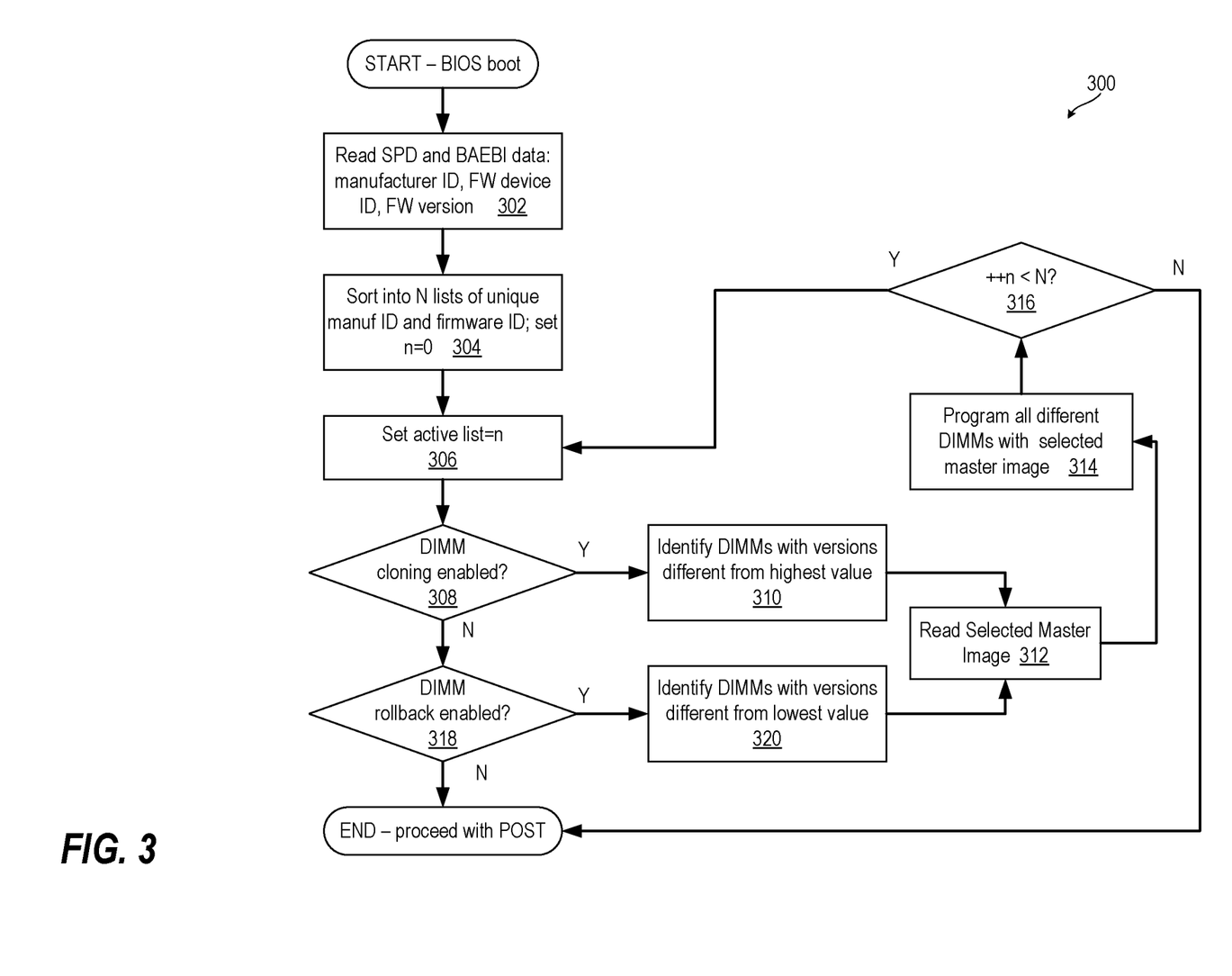
FIG. 3 illustrates a flow diagram of a method of automatically retrieving a firmware reference image from one of the persistent memory devices, according to one or more embodiments.

FIG. 3 illustrates a method 300 for automatic intra-system firmware image updating that is implemented in a firmware interface during a system boot or restart operation of an IHS, such as implemented by BIOS. Method 300 represents a first embodiment in which the reference image is retrieved automatically from one of the persistent memory devices. In one or more embodiments, a feature enablement setting in the BIOS enables, controls, or gates whether or not method 300 is performed at all. Method 300 begins at start block and includes reading, by a processor, SPD and DIMM data including manufacturer ID, firmware device ID, and firmware version ID (block 302). Processor sorts the data into N lists of unique manufacturer IDs and firmware IDs and sets a loop pointer n=0 (block 304). Processor sets active list to n (block 306). A determination is made as to whether DIMM cloning is enabled (decision block 308). In response to DIMM cloning being enabled, method 300 includes identifying, by the processor, DIMMs with a version of the firmware image that are different from the highest value version (block 310). Processor reads the selected master image from an intra-system location (block 312). For example, the selected master image may be provisioned on one of the DIMMs. For another example, the selected master image may be stored on an intra-system location that is accessible to a remote access controller. Processor programs all DIMMs of the same type and having a different version with the selected master image (block 314). A determination is made as to whether an incremented value of loop pointer n is less than the total number of lists N (decision block 316). If incremented value of loop pointer is less, then method 300 returns to block 306 to check for versioning of another type of persistent memory. Versioning is the creation and management of multiple releases of a product, all of which have the same general function, with each new version being improved, upgraded or customized. If incremented value of loop pointer is not less in decision block 316, then method 300 ends.

Returning to decision block 308, in response to DIMM cloning not being enabled, a determination is made as to whether DIMM rollback is enabled (decision block 318). In response to DIMM rollback not being enabled, method 300 ends. In response to DIMM rollback being enabled, method 300 includes identifying, by the processor, DIMMs with version that are different from the lowest value (block 320). Then method 300 proceeds to block 312 to initiate rolling back firmware images.

Figure 4:
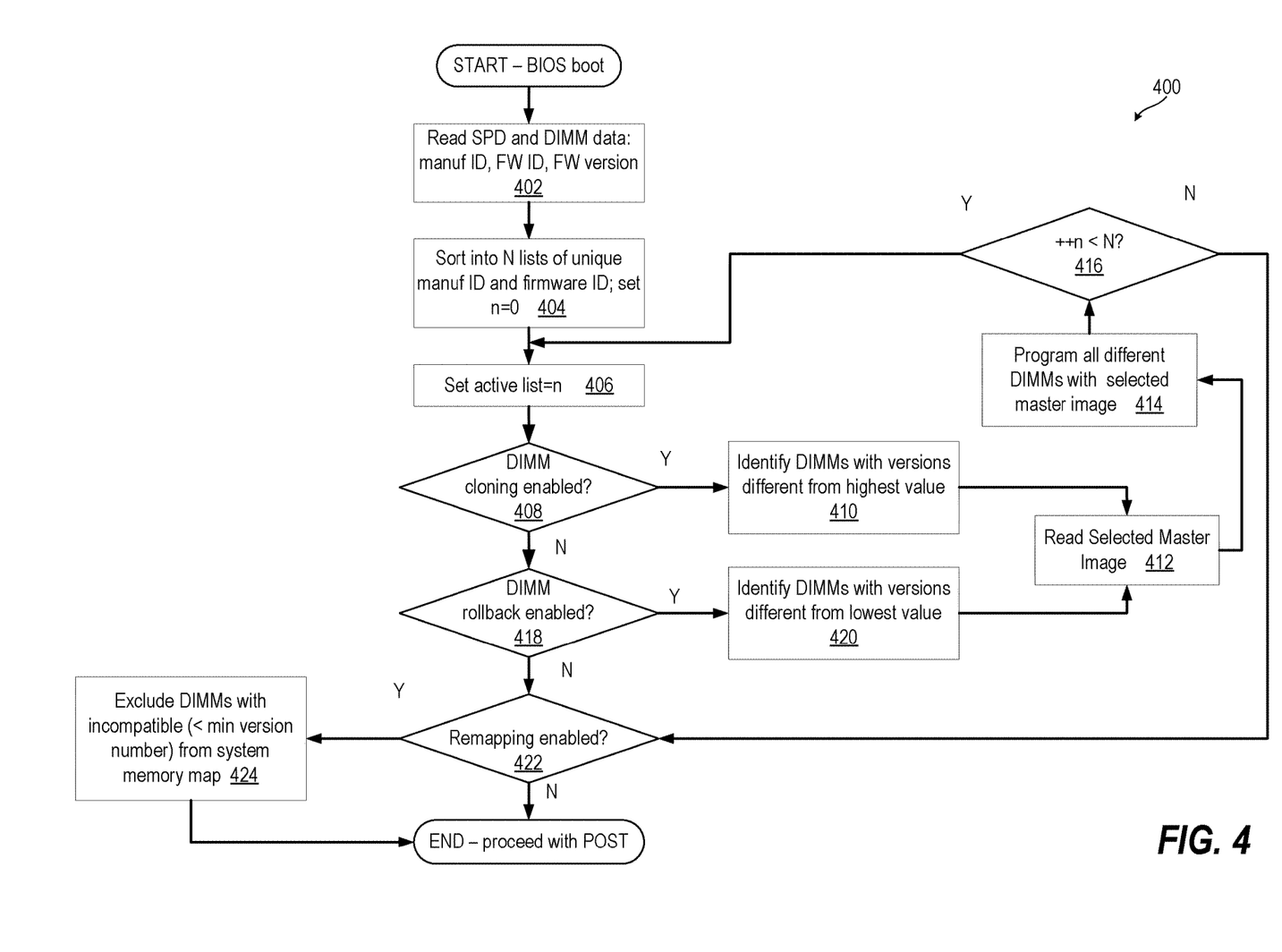
FIG. 4 illustrates a flow diagram of a method of automatically retrieving a firmware reference image from one of the persistent memory devices and remapping enumerated memory for the operating system, according to one or more embodiments.

FIG. 4 illustrates a method 400 that is performed by a firmware interface such as by BIOS during a boot or restart operation. Method 400 enables a first embodiment in which the reference image is retrieved automatically from one of the persistent memory devices. In one or more embodiments, a feature enablement setting gates whether or not method 400 is performed. Method 400 begins at start block and includes reading, by a processor, SPD and DIMM data including manufacturer ID, firmware device ID, and firmware version ID (block 402). Processor sorts data into N lists of unique manufacturer IDs and firmware IDs and sets a loop pointer n=0 (block 404). Processor sets active list to n (block 406). A determination is made as to whether DIMM cloning is enabled (decision block 408). If enabled, method 400 includes identifying, by the processor, DIMMs with a version of the firmware image that are different from the highest value (block 410). Processor reads selected master image (block 412). Processor programs all different DIMMs with the selected master image (block 414). A determination is made as to whether an incremented value of loop pointer n is less than the total number of lists N (decision block 416).

If the incremented value of loop pointer is less, then method 400 returns to block 406 to check for versioning of another type of persistent memory. If the incremented value of loop pointer is not less, then method 400 ends.

Returning to decision block 408, if DIMM cloning is not enabled, a determination is made as to whether DIMM rollback is enabled (decision block 418). In response to DIMM rollback being enabled in decision block 418, method 400 includes identifying, by the processor, DIMMs with version that are different from the lowest version value (block 420). Then method 400 proceeds to block 412 to initiate rolling back firmware images, as described above.

Returning to decision block 418, if rollback is not enabled, a determination is made as to whether memory remapping is enabled (decision block 422). In response to remapping not being enabled, method 400 ends. In response to remapping being enabled, method includes excluding DIMMs that have an incompatible version of the firmware image, such as a firmware image being less than a minimum version (block 424). Then method 400 ends.

Method 400 provides a feature for addressing firmware version incompatibilities. If the firmware matches incompatibilities or vendor defined image is not updateable, IHS can rebase or modify a memory map to not enumerate this NVDIMM as part of the memory map. The memory map is published to an OS memory map (E820) with an Error message. BIOS-e820 refers to the facility by which the BIOS of x86-based computer systems reports the memory map to the operating system or boot loader.

Methods 300, 400 provide for selecting the firmware image in accordance with BIOS configuration settings such as: (i) a binary feature enablement; (ii) a setting for enabling rollback; (iii) a setting that directs BIOS to read the active image from the device; (iv) a setting that directs BIOS to read an inactive image from the device as an alternate image than what is specified by JEDEC to include in the selection; (v) a setting that directs BIOS to read the SPD metadata specified in one or more embodiments; (vi) an enablement that directs BIOS to allow the execution of binary code contained in the metadata; and (vii) a setting or settings to enable the dynamic mapping based on incompatible images. All of the potential settings described here can be combined into one or more settings that define the mode of automatic update.

Figure 5:
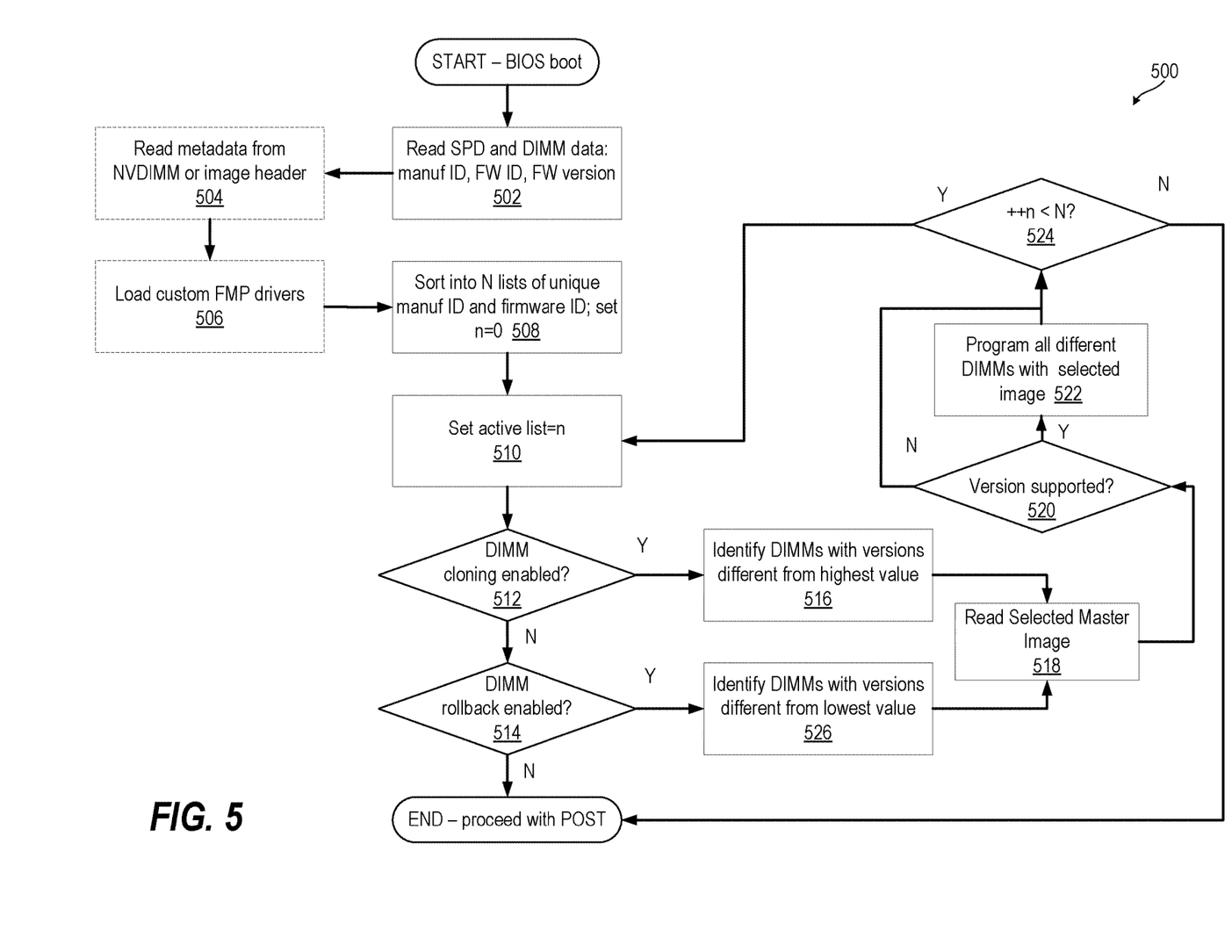
FIG. 5 illustrates a flow diagram of a method of automatically retrieving a firmware reference image from an intra-system storage location other than one of the persistent memory devices, according to one or more embodiments.

FIG. 5 illustrates a method 500 implemented by a firmware interface such as by BIOS during a boot or restart operation. Method 500 enables an embodiment in which the reference image is retrieved automatically from an intra-system storage location other than one of the persistent memory devices. In one or more embodiments, a feature enablement setting gates whether or not method 500 is performed. Method 500 begins reading, by a processor, SPD and DIMM data, including manufacturer ID, firmware device ID, and firmware version ID (block 502). Processor reads metadata from NVDIMM or image header (block 504). Method 500 includes loading custom Firmware Management Protocol (FMP) drivers (block 506). Processor sorts data into N lists of unique manufacturer IDs and firmware IDs and sets a loop pointer n=0 (block 508). Processor sets active list to n (block 510). A determination is made as to whether DIMM cloning is enabled (decision block 512). If DIMM cloning is not enabled, a determination is made as to whether DIMM rollback is enabled (decision block 514). If DIMM rollback is not enabled, method 500 ends. In response to DIMM cloning being enabled in decision block 512, method 500 includes identifying, by the processor, DIMMs with version that are different from the highest value (block 516). Processor reads the selected master image (block 518). A determination is made as to whether the version of the selected master image is supported (block 520). If supported, processor programs DIMMs of the same device type but having a version of the firmware image with the selected master image (block 522). A determination is made as to whether an incremented value of loop pointer n is less than the total number of lists N (decision block 524). If incremented loop pointer is less, then method 500 returns to block 510 to check for versioning of another type of persistent memory. If incremented value of loop point is not less, then method 500 ends. In response to determining that the version was not supported in decision block 520, method 500 proceeds to block 524. In response to DIMM rollback being enabled in decision block 514, method 500 includes identifying, by the processor, DIMMs with version that are different from the lowest value (block 526). Then method 500 proceeds to block 518.

Figure 6:
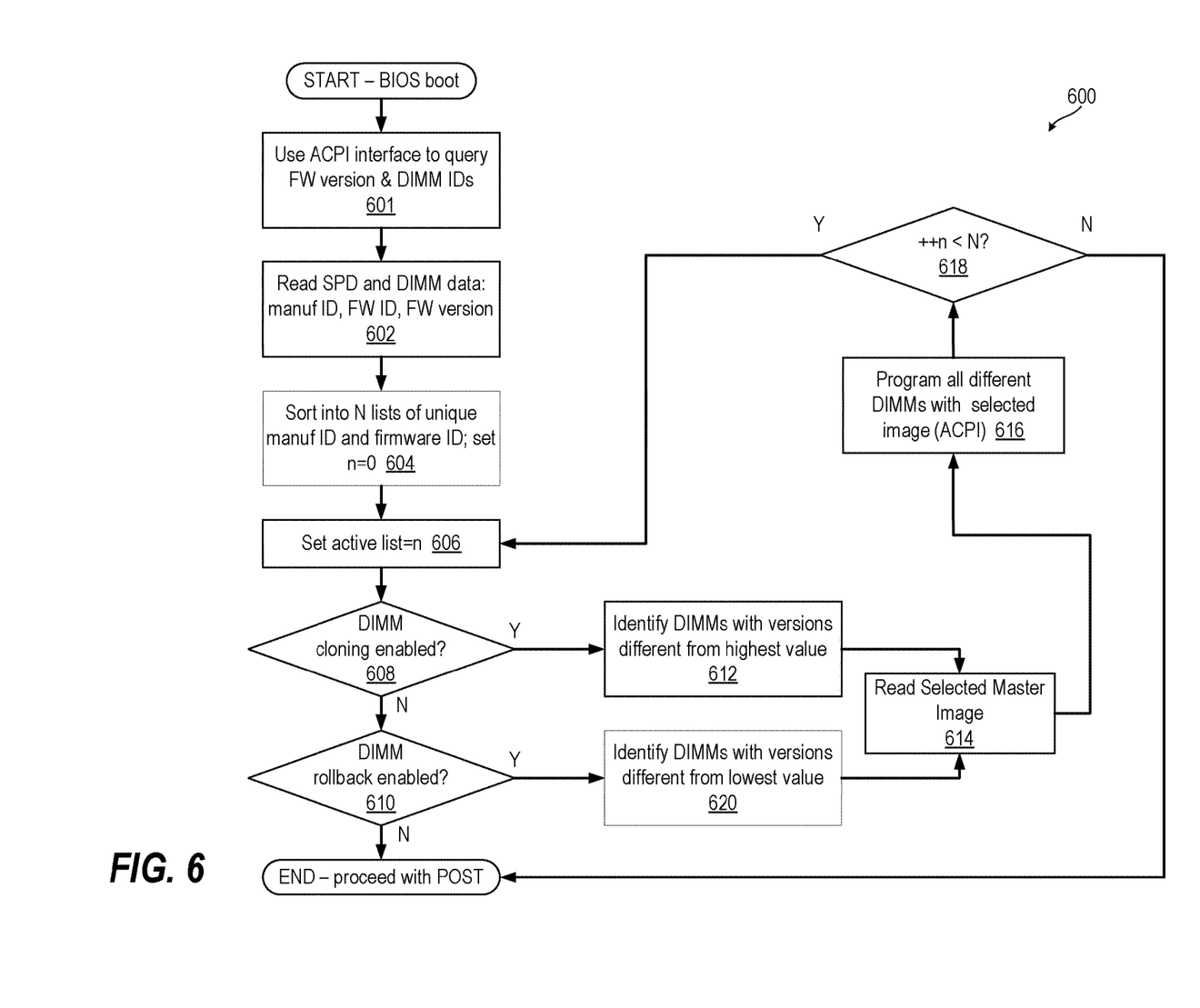
FIG. 6 illustrates a flow diagram of a method of triggering an intra-system firmware update by a persistent agent of the operating system, according to one or more embodiments.

FIG. 6 illustrates a method 600 wherein the update of firmware images of persistent memory devices is performed by software running on the operating system. In one embodiment, a trigger condition for the update can be a hot-plug event. An Advanced Configuration and Power Interface (ACPI) module in the OS can be used by a persistent agent launched by the firmware interface during restart or reboot. The ACPI specification provides an open standard that operating systems can use to perform discovery and configuration of computer hardware components, to perform power management by, for example, putting unused components to sleep, and to perform status monitoring. Internally, ACPI advertises the available components and their functions to the operating system kernel using instruction lists ("methods") provided through a system firmware interface (UEFI or BIOS), which the kernel parses. The OS then executes the desired operations such as the initialization of hardware components using an embedded minimal virtual machine. With further reference to FIG. 6, method 600 begins using ACPI interface to query firmware version and DIMM IDs (block 601). Method 600 includes reading, by a processor, SPD and DIMM data including manufacturer ID, firmware device ID, and firmware version ID (block 602). Processor sorts data into N lists of unique manufacturer IDs and firmware IDs and sets a loop pointer n=0 (block 604). Processor sets active list to n (block 606). A determination is made as to whether DIMM cloning is enabled (decision block 608). If DIMM cloning is not enabled, a determination is made as to whether DIMM rollback is enabled (decision block 610). If DIMM rollback is not enabled, method 600 ends. In response to DIMM cloning being enabled in decision block 608, method 600 includes identifying, by the processor, DIMMs with version that are different from the highest value (block 612). Processor read selected master image (block 614). Processor programs all different DIMMs with selected master image using ACPI (block 616). A determination is made as to whether an incremented value of loop pointer n is less than the total number of lists N (decision block 618). If incremented loop pointer is less than the total number of lists N, then method 600 returns to block 606 to check for versioning of another type of persistent memory. If incremented value of loop pointer is not less, then method 600 ends. In response to DIMM rollback being enabled in decision block 610, method 600 includes identifying, by the processor, DIMMs with version that are different from the lowest value (block 620). Then method 600 proceeds to block 614 to continue rolling back firmware images.

Figure 7:
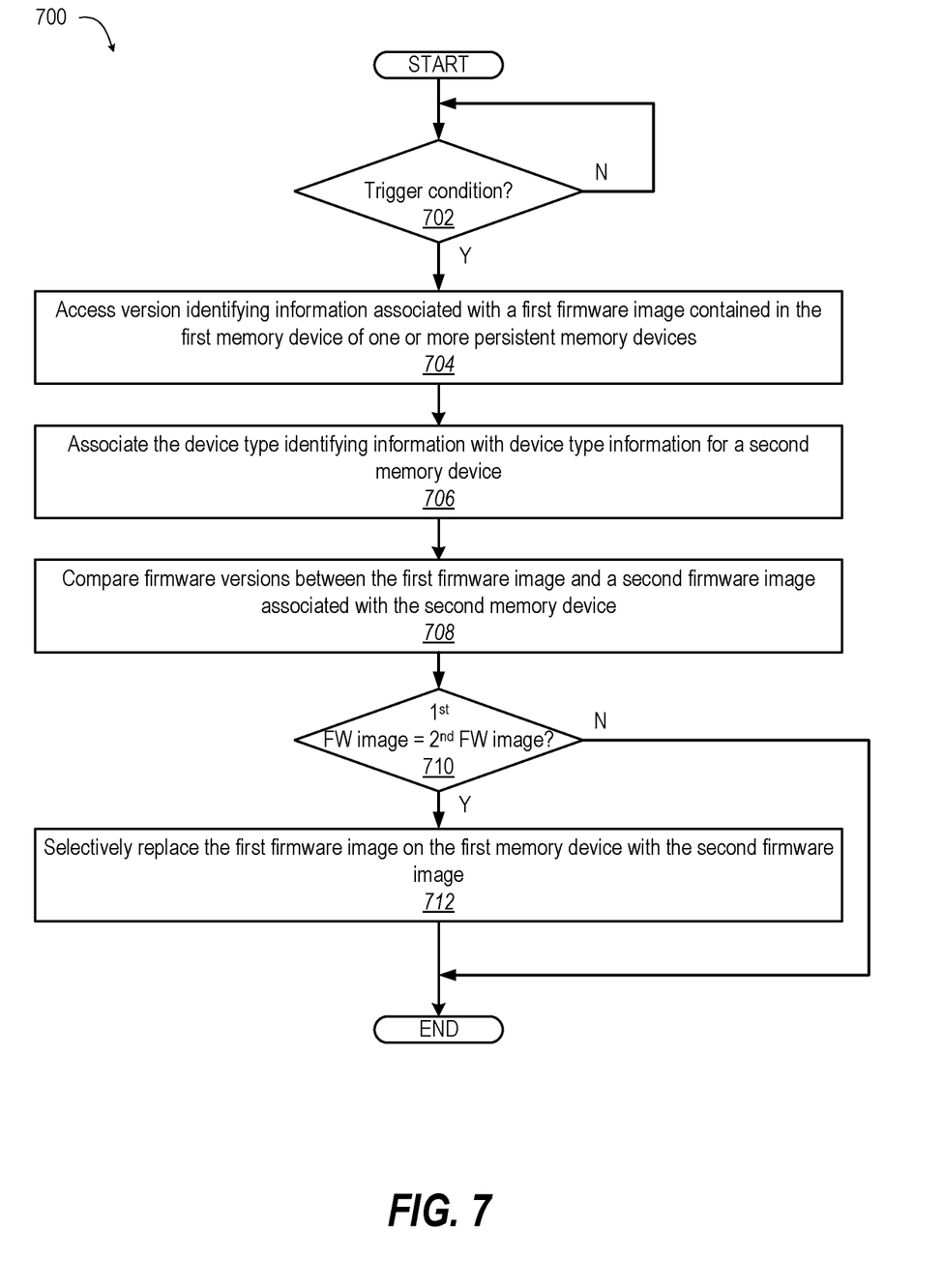
FIG. 7 illustrates a flow diagram of a method of performing an intra-system firmware update of a persistent memory device of an IHS, according to one or more embodiments.

FIG. 7 illustrates a method 700 of automatic intra-system or intra-machine updating of firmware that controls a persistent memory device. In one or more embodiments, method 700 includes identifying, by a processor executing a firmware interface of an IHS, at least one of a plurality of possible trigger conditions (decision block 702), for example, a hot-plug event in which an NVDIMM is inserted into a running system. In response to not identifying a trigger condition, method 700 returns to decision block 702. In response to identifying at least one of the plurality of possible trigger conditions, the processor accesses version identifying information associated with a first firmware image contained in the first memory device of one or more persistent memory devices (block 704). The processor also accesses device type identifying information contained in the first memory device of the one or more persistent memory devices (block 706). Method 700 includes associating, by the processor, the device type identifying information with version identifying information for a second firmware image that is locally accessible within the IHS (block 708). The processor makes a determination of whether the first firmware image equals the second firmware image (decision block 710). In response to the first firmware image being equal to the second firmware image, method 700 ends. In response to the first firmware image being different from the second firmware image, the processor selectively replaces the first firmware image on the first memory device with the second firmware image (block 712). Then method 700 ends.

In one or more embodiments, the one or more persistent memory devices include a second memory device that contains: (i) the second firmware image; (ii) version identifying information associated with the second firmware image; and (iii) device type identifying information that is identical to the device type identifying information of the first memory device. In a particular embodiment with this configuration of IHS, method 700 includes identifying, by the processor, one of the plurality of possible trigger conditions by identifying a first trigger that the second memory device has been added to the IHS during a system start. In another particular embodiment, method 700 includes identifying, by the processor, one of the plurality of possible trigger conditions by: (i) activating a persistent agent as part of an operating system executed by the processor; and (ii) identifying, by the persistent agent, a second trigger of a hot plugging event of the second memory device.

In one or more embodiments, method 700 includes the processor accessing, in a non-volatile memory coupled to the firmware interface suite, (i) the second firmware image and (ii) metadata associating the second firmware image to the device type identifying information. In an exemplary embodiment, the device type identifying information is manufacturer identifying information that is unique to a specific manufacturer. In this embodiment, method 700 includes the processor replacing the first firmware image with the second firmware image by executing a driver contained in the metadata that performs a firmware management protocol. The processor identifies a third trigger of possible trigger conditions. The third trigger is a determination that both the first and second firmware images are associated with identical manufacturer identifying information.

For clarity, previously described embodiments are assumed to comprise persistent memory devices that have updateable firmware images. In one or more embodiments, however, the IHS may contain persistent memory devices that lack this functionality. An inability to be updated may or may not pose a problem to the IHS depending on how the persistent memory devices are used. Thus, in some instances it can be appropriate to use persistent memory devices that cannot be updated to match other persistent memory devices that are updateable. In other instances, it can be appropriate to exclude such persistent memory devices from being used by other functional components of the IHS. To this end, method 700 includes identifying a fourth trigger of the plurality of possible trigger conditions. The fourth trigger is a determination that the first firmware image is updateable by the second firmware image. In response to determining that the first firmware image is updateable by the second firmware image, the firmware interface causes the processor to: (i) replace the first firmware image with the second firmware image; and (ii) publish a memory map to an operating system enumerating the first memory device as usable to functional components of the IHS. In an exemplary embodiment, in response to determining that the first firmware image is not updateable, method 700 includes publishing to the operating system a memory map that does not enumerate the first memory device.

In one or more embodiments, method 700 includes determining whether a configuration setting of the firmware interface indicates a selected one of: (i) updating to a higher version of the firmware image; and (ii) rolling back to a lower version of the firmware image. The processor replaces the first firmware image with the second firmware image in response to the configuration setting indicating the updating to a higher version and the second firmware image being the higher version of the firmware image. The processor replaces the first firmware image with the second firmware image in response to the configuration setting indicating the rolling back to a lower version and the second firmware image being the lower version of the firmware image.

In one or more embodiments, method 700 includes controlling, by a board management controller coupled to the firmware interface suite that performs out-of-band control by communicating via a remote access controller to a management console. Automatic intra-system firmware updates of the persistent memory devices can be modified in one or more ways. In particular, the baseband management controller can control updates to firmware images on the one or more persistent memory devices by changing one or more configuration settings of the firmware interface. Examples of configuration settings that can be changed include: (i) enablement of firmware updates. Gating of this capability allows the IHS to maintain current firmware images of the persistent memory devices. Gating is a process in which a predetermined set of conditions, when established, permits a second process to occur. Another example of a configuration setting is: (ii) enablement of version rollback to a lower version. In response to finding some incompatibility or other issue with a later version of the firmware image, the system can automatically or be manually directed to revert back to a lower version of the firmware image. An additional example of a configuration setting of the firmware interface includes: (iii) enablement of version update to a highest available version. The system can be automatically or manually enabled to update to a latest version in order to have the benefits of a later firmware image, such as fixes to bugs or additional functionality. A further example of a configuration setting of the firmware interface is: (iv) directions to read active firmware versions on the one or more persistent memory devices. This direction can specify where the IHS is to look for version control, which in this instance is the active firmware image being executed by the respective persistent memory device. Another example of a configuration setting that is selectable by the baseband management controller includes: (v) directions to read inactive firmware versions on the one or more persistent memory devices. This setting can enable detection of an alternate firmware version that is not active but that may have been provisioned by the OEM of the persistent memory device. An additional example of a configuration setting is: (vi) directions to read metadata contained in the one or more persistent memory devices. Directing the IHS to read the metadata can provide cross referencing of the firmware image to other information. An example of a configuration includes: (vii) enablement to execute binary code contained in the metadata. The binary code can be a driver that assists in selecting an appropriate firmware image or provides other functionality. An additional example of a configuration setting of the firmware interface for intra-system firmware updates of persistent memory devices includes: (viii) directions to dynamically map memory based in part on compatibility of firmware images. The IHS can be limited in utilizing persistent memory devices that have a version of the firmware image that is deemed appropriate. A memory map that results from the dynamic mapping of the memory can reflect the identification and updating performed by the firmware interface.

In the above described flow charts of FIG. 3-7, one or more of the methods may be embodied in a controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An Information Handling System (IHS) comprising:
   a processor;
   one or more first persistent memory devices coupled to the processor, each of the first persistent memory devices comprising: (i) a first firmware image, (ii) version identifying information associated with the first firmware image, and (iii) device type identifying information; and
   a firmware interface suite coupled to the processor and comprising a firmware interface that is executed by the processor to cause the processor to:
   in response to identifying at least one of a plurality of possible trigger conditions for automatic intra-system firmware update of a persistent memory device, the possible trigger conditions comprising a system boot, a restart operation, or a hot plug event, the system boot and restart operation comprising detection by the processor that a persistent second persistent memory device has been added to the IHS while the IHS is powered down and not as the hot plug event:
   access the version identifying information and the device type identifying information for a first memory device of the one or more first persistent memory devices, the first memory device containing the first firmware image;
   match the device type identifying information for the first memory device with device type identifying information for the second persistent memory device, the second persistent memory device containing or supporting operation via a second firmware image, wherein the second persistent memory device comprises a non-volatile memory coupled to the firmware interface suite and comprising: (i) the second firmware image; and (ii) metadata associating the second firmware image to the device type identifying information of the second persistent memory device, the metadata comprising a Firmware Management Protocol (FMP)

driver Globally Unique Identifier (GUID) that allows a vendor-specific update rather than a Joint Electron Device Engineering Council (JEDEC) standard update for a class of persistent memory devices;

compare firmware versions between the first firmware image of the first memory device and the second firmware image of the second persistent memory device;

in response to the first firmware image of the first memory device being different from the second firmware image and the device type identifying information of the first memory device being the same as the device type identifying information of the second persistent memory device, selectively replace the first firmware image on the first memory device with the second firmware image, wherein the first firmware image of the first memory device is automatically upgraded or roll-backed from the first firmware image of the first memory device to the second firmware image; and subsequently operating each of the one or more first persistent memory devices and the second persistent memory device utilizing the second firmware image, wherein persistent memory devices with a same device type identifying information operate using a same version of firmware image;

in response to the system boot or the restart operation by a basic input/output system (BIOS) of the IHS, detect whether a feature enablement in the BIOS is set for automatically updating intra-system firmware image; and in response to the feature enablement being set for automatic updating of the intra-system firmware image:

read serial presence detect (SPD) and dual inline memory module (DIMM) data, including manufacturer identifier (ID), firmware device ID, and firmware version ID;

sort the data into list of unique manufacture IDs and firmware device IDs;

determine whether DIMM cloning is enabled; and in response to the DIMM cloning being enabled: select a master image of firmware;

identify DIMMs with a version of firmware image that is different from a version of the selected master image; and program the identified DIMMs with the selected master image.

2. The IHS of claim 1, wherein the second persistent memory device further comprises: (i) the second firmware image, (ii) version identifying information associated with the second firmware image, and (iii) the device type identifying information that is identical to the device type identifying information of the first memory device.

3. The IHS of claim 2, further comprising a random access memory coupled to the processor and containing an operating system, wherein:

the firmware interface causes the processor to activate a persistent agent executed by the processor as part of the operating system; and another trigger of the plurality of possible trigger conditions comprises the firmware interface causing the processor, via the persistent agent, to detect a hot plugging event of the second persistent memory device.

4. The IHS of claim 1, wherein:

All of the device type identifying information comprises manufacturer identifying information that is unique to a specific manufacturer;

the metadata comprises a driver that performs a firmware management protocol that replaces the first firmware image of the first memory device with the second firmware image; and another trigger of the plurality of possible trigger conditions comprises the firmware interface causing the processor to determine that both the first and second firmware images are associated with identical manufacturer identifying information.

5. The IHS of claim 1, further comprising a random access memory coupled to the processor and containing an operating system, wherein:

another trigger of the plurality of possible trigger conditions comprises the firmware interface causing the processor to determining that the first memory device comprises the first firmware image that is updateable by the second firmware image; and in response to determining that the first firmware image of the first memory device is updateable by the second firmware image, the firmware interface causes the processor to:

replace the first firmware image of the first memory device with the second firmware image; and publish a memory map to the operating system enumerating the first memory device as usable to functional components of the IHS.

6. The HIS of claim 5, wherein, in response to determining that the first firmware image of the first memory device is not updateable, the firmware interface publishes to the operating system a memory map that does not enumerate the first memory device.

7. The IHS of claim 1, wherein the firmware interface causes the processor to:

determine whether a configuration setting of the firmware interface indicates a selected one of: (i) updating to a higher version of a firmware image; and (ii) rolling back to a lower version of the firmware image;

replace the first firmware image with the second firmware image in response to a setting indicating an update and the second firmware image being the higher version; and replace the first firmware image with the second firmware image in response to the configuration setting indicating rolling back and the second firmware image being the lower version of the firmware image.

8. The IHS of claim 1, further comprising a board management controller coupled to the firmware interface suite and which controls updates to firmware images on each of the one or more first persistent memory devices and the second persistent memory device by changing a setting for a selected one or more of: (i) enablement of firmware updates; (ii) enablement of version rollback to a lowest available version; (iii) enablement of version update to a highest available version; (iv) directions to read active firmware versions on each of the one or more first persistent memory devices and the second persistent memory device; (v) directions to read inactive firmware versions on each of the one or more first persistent memory devices and the second persistent memory device; (vi) directions to read metadata contained on each of the one or more first persistent memory devices and the second persistent memory device; (vii) enablement to execute binary code contained in the metadata; and (viii) directions to dynamically map memory based in part on compatibility of the firmware images.

9. The IHS of claim 1, wherein the firmware interface is further executed by the processor to cause the processor to:
in response to the DIMM cloning not being enabled:
determine whether DIMM rollback is enabled;
in response to the DIMM rollback being enabled: identifying DIMMs with firmware versions that are different from a lowest version value; and initiate rollback of firmware images for the identified DIMMs to the lowest version value; and
in response to the DIMM rollback not being enabled:
determining whether memory remapping is enabled; and
in response to the memory remapping being enabled, excluding DIMMs that have an incompatible version of the firmware image, including a firmware image less than a minimum version.

10. A method comprising:
identifying, by a processor executing a firmware interface of a firmware interface suite coupled to the processor of an information handling system (IHS), at least one of a plurality of possible trigger conditions for automatic intra-system firmware update of a first memory device of one or more persistent memory devices, each of the one or more persistent memory devices coupled to the processor, and the first memory device comprising: (i) a first firmware image, (ii) version identifying information associated with the first firmware image, and (iii) device type identifying information; and
in response to identifying the at least one of the plurality of possible trigger conditions for automatic intra-system firmware update of a persistent memory device, the possible trigger conditions comprising a system boot, a restart operation, or a hot plug event, the system boot and restart operation comprising detection by the processor that a second memory device has been added to the IHS while the IHS is powered down and not as the hot plug event:
accessing the version identifying information associated with the first firmware image contained in the first memory device of the one or more persistent memory devices;
matching the device type identifying information for the first memory device with device type identifying information for the second memory device, the second memory device being a persistent memory device containing a second firmware image, wherein the second memory device comprises a non-volatile memory coupled to the firmware interface suite and comprising: (i) the second firmware image; and (ii) metadata associating the second firmware image to the device type identifying information of the second memory device, the metadata comprising a Firmware Management Protocol (FMP) driver Globally Unique Identifier (GUID) that allows a vendor-specific update rather than a Joint Electron Device Engineering Council (JEDEC) standard update for a class of persistent memory devices;
comparing firmware versions between the first firmware image of the first memory device and the second firmware image associated with the second memory device;
in response to the first firmware image of the first memory device being different from the second firmware image and the device type identifying information of the first memory device being the same as the device type identifying information of the second memory device, selectively replacing the first firmware image on the first memory device with the second firmware image, wherein the first firmware image of the first memory device is automatically upgraded or roll-backed from the first firmware image of the first memory device to the second firmware image; and
subsequently operating each of the one or more persistent memory devices and the second memory device utilizing the second firmware image, wherein persistent memory devices with a same device type identifying information operate using a same version of firmware image;
in response to the system boot or the restart operation by a basic input/output system (BIOS) of the IHS, detecting whether a feature enablement in the BIOS is set for automatically updating intra-system firmware image; and
in response to the feature enablement being set for automatic updating of the intra-system firmware image:
reading serial presence detect (SPD) and dual inline memory module (DIMM) data, including manufacturer identifier (ID), firmware device ID, and firmware version ID;
sorting the data into list of unique manufacture IDs and firmware device IDs;
determining whether DIMM cloning is enabled; and
in response to the DIMM cloning being enabled: selecting a master image of firmware; identify DIMMs with a version of firmware image that is different from a version of the selected master image; and program the identified DIMMs with the selected master image.

11. The method of claim 10, wherein the second memory device comprises: (i) the second firmware image, (ii) version identifying information associated with the second firmware image, and (iii) the device type identifying information that is identical to the device type identifying information of the first memory device.

12. The method of claim 11, wherein identifying one of the plurality of possible trigger conditions comprises:
activating a persistent agent as part of an operating system executed by the processor; and
identifying, by the persistent agent, another trigger of a hot plugging event of the second memory device.

13. The method of claim 10, wherein:
All of the device type identifying information comprises manufacturer identifying information that is unique to a specific manufacturer;
replacing the first firmware image of the first memory device with the second firmware image comprises executing a driver contained in the metadata that performs a firmware management protocol; and
identifying one of the plurality of possible trigger conditions comprises identifying another trigger that both the first and second firmware images are associated with identical manufacturer identifying information.

14. The method of claim 10, wherein:
identifying one of the plurality of possible trigger conditions comprises determining another trigger that the first memory device comprises the first firmware image that is updateable by the second firmware image; and
in response to determining that the first firmware image is updateable by the second firmware image, the firmware interface:
replacing the first firmware image of the first memory device with the second firmware image; and
publishing a memory map to an operating system enumerating the first memory device as usable to functional components of the IHS.

15. The method of claim 14, wherein, in response to determining that the first firmware image of the first memory device is not updateable, publishing to the operating system a memory map that does not enumerate the first memory device.

16. The method of claim 10, further comprising:
determining whether a configuration setting of the firmware interface indicates a selected one of: (i) updating to a higher version of a firmware image; and (ii) rolling back to a lower version of the firmware image;
replacing the first firmware image with the second firmware image in response to the configuration setting indicates updating and the second firmware image being the higher version of the firmware image; and
replacing the first firmware image with the second firmware image in response to the configuration setting indicates rolling back and the second firmware image being the lower version of the firmware image.

17. The method of claim 10, further comprising controlling, by a board management controller coupled to the firmware interface suite and which controls updates to firmware images on persistent memory devices, including the one or more persistent memory devices and the second memory device, by changing a setting for a selected one or more of: (i) enablement of firmware updates; (ii) enablement of version rollback to a lowest available version; (iii) enablement of version update to a highest available version; (iv) directions to read active firmware versions on the persistent memory devices; (v) directions to read inactive firmware versions on the persistent memory devices; (vi) directions to read metadata contained on the persistent memory devices; (vii) enablement to execute binary code contained in the metadata; (viii) and directions to dynamically map memory based in part on compatibility of the firmware images.

* * * * *

UNITED STATES PATENT AND TRADEMARK OFFICE
CERTIFICATE OF CORRECTION

PATENT NO. : 10,936,299 B2
APPLICATION NO. : 15/581054
DATED : March 2, 2021
INVENTOR(S) : Wade A. Butcher, Vijay R. Nijhawan and Sumanth Vidyadhara Page 1 of 1

It is certified that error appears in the above-identified patent and that said Letters Patent is hereby corrected as shown below:

In the Claims

Column 14, Claim 1, Line 48, after "that a" delete "persistent".

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*